US008559126B2

(12) United States Patent
Yasuna et al.

(10) Patent No.: US 8,559,126 B2
(45) Date of Patent: Oct. 15, 2013

(54) METHOD AND APPARATUS FOR POSITIONING A MAGNETIC-RECORDING HEAD

(75) Inventors: Kei Yasuna, Kanagawa (JP); Minoru Hashimoto, Kanagawa (JP); Thambirajah Suthasun, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 894 days.

(21) Appl. No.: 12/545,000

(22) Filed: Aug. 20, 2009

(65) Prior Publication Data

US 2011/0063751 A1  Mar. 17, 2011

(30) Foreign Application Priority Data

Aug. 21, 2008 (JP) ................................. 2008-212885

(51) Int. Cl.
*G11B 5/596* (2006.01)
(52) U.S. Cl.
USPC ........................ 360/55; 360/77.08; 360/77.04

(58) Field of Classification Search
None
See application file for complete search history.

(56) References Cited

U.S. PATENT DOCUMENTS

| 5,602,692 | A  | * | 2/1997 | Freitas et al. | 360/77.08 |
| 5,659,436 | A  |   | 8/1997 | Yarmchuk et al. | |
| 5,801,895 | A  | * | 9/1998 | Abramovich | 360/77.04 |
| 6,700,731 | B2 | * | 3/2004 | Chew | 360/77.04 |
| 6,760,184 | B1 | * | 7/2004 | Cunningham | 360/77.08 |
| 7,315,431 | B1 | * | 1/2008 | Perlmutter et al. | 360/77.04 |
| 7,408,735 | B1 | * | 8/2008 | Coric | 360/77.04 |
| 2008/0158717 | A1 | * | 7/2008 | Sasamoto | 360/77.07 |

* cited by examiner

*Primary Examiner* — Wayne Young
*Assistant Examiner* — James L Habermehl (57) ABSTRACT

A method for positioning a magnetic-recording head. The method includes correcting amplitude of each burst signal of a plurality of burst signals read out with the magnetic-recording head from each respective burst pattern of a plurality of burst patterns. In addition, the method includes computing a deviation of the magnetic-recording head from a track based on corrected amplitudes of the plurality of burst signals. Moreover, the method includes positioning the magnetic-recording head on the track based on the deviation of the magnetic-recording head.

8 Claims, 10 Drawing Sheets

METHOD AND APPARATUS FOR POSITIONING A MAGNETIC-RECORDING HEAD

CROSS-REFERENCE TO RELATED APPLICATION

This application claims priority from the Japanese Patent Application No. 2008-212885, filed Aug. 21, 2008, the disclosure of which is incorporated herein in its entirety by reference.

TECHNICAL FIELD

Embodiments of the present invention relate to hard-disk drives (HDDs), and an apparatus and method for positioning a magnetic-recording head in a HDD.

BACKGROUND

In a magnetic-recording disk of a hard-disk drive (HDD), a plurality of burst patterns having positions different from each other in the radial direction are formed in a self-servo writing (SSW) process. These burst patterns provide information for the location of a track by servo electronics of the HDD in the writing of data to the magnetic-recording disk. The HDD computes the deviation of the magnetic-recording head from the track and positions the magnetic-recording head based on the burst signals read out with the magnetic-recording head from the burst patterns. Under some circumstances, a plurality of burst patterns may be misaligned individually due to fluctuations in position of a magnetic-recording head during burst pattern writing. The effect of such misalignment is included in the computed deviation of the magnetic-recording head. For example, if a magnetic-recording head is positioned based on the deviation of the magnetic-recording head including the effect of such misalignment and new burst patterns are written to the magnetic-recording disk under such circumstances, misalignment may accumulate as further burst patterns are written as the self-servo writing (SSW) process proceeds.

Manufacturing and development engineers engaged in the manufacture and design of HDDs are interested in reducing the time to manufacture and in increasing the reliability of HDDs. Therefore, the attention of manufacturing and development engineers has been directed towards eliminating the effects of such misalignment.

SUMMARY

Embodiments of the present invention include a method for positioning a magnetic-recording head. The method includes correcting amplitude of each burst signal of a plurality of burst signals read out with the magnetic-recording head from each respective burst pattern of a plurality of burst patterns. In addition, the method includes computing a deviation of the magnetic-recording head from a track based on corrected amplitudes of the plurality of burst signals. Moreover, the method includes positioning the magnetic-recording head on the track based on the deviation of the magnetic-recording head.

DESCRIPTION OF THE DRAWINGS

The accompanying drawings, which are incorporated in and form a part of this specification, illustrate embodiments of the invention and, together with the description, serve to explain the embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Description of Embodiments of the Present Invention for a Method and an Apparatus for Positioning a Magnetic-Recording Head Embodiments of the present invention address the issue of the manner in which to estimate the magnitude of the effect of the misalignment in each of the burst patterns from the deviation of the magnetic-recording head resulting from the misalignment. A previously used approach utilizes various functions and lookup tables with the aim of reducing nonlinearity; but, when the deviation of a magnetic-recording head is computed with the previously used approach, the effect of the misalignment in each of the burst patterns may prove difficult to remove from the computed deviation of the magnetic-recording head.

Embodiments of the present invention provide a method and an apparatus for positioning a magnetic-recording head, which make it possible to reduce the effect of the misalignment of each of a plurality of burst patterns when the magnetic-recording head is positioned based on the burst signals read out from the plurality of burst patterns. To deal with this effect, in accordance with embodiments of the present invention, a method for positioning a magnetic-recording head positions the magnetic-recording head on a track determined by a plurality of burst patterns such that positions of the plurality of burst patterns are different from each other in a scanning direction of the magnetic-recording head. In accordance with embodiments of the present invention, the method for positioning the magnetic-recording head includes the operations of: correcting amplitude of each of the burst signals of the plurality of burst signals read out with the magnetic-recording head from each respective burst pattern of a plurality of burst patterns; computing the deviation of the magnetic-recording head from the track based on corrected amplitudes of the plurality of burst signals; and positioning the magnetic-recording head on the track based on the deviation of the magnetic-recording head.

In one embodiment of the present invention, the amplitude of each of the burst signals of the plurality of burst signals is corrected based on misalignment information that is obtained before the deviation of the magnetic-recording head is computed and related to the misalignment of each of the burst patterns perpendicular to the scanning direction.

In another embodiment of the present invention, the misalignment information includes the deviation of the magnetic-recording head that has occurred when the burst patterns are formed.

In another embodiment of the present invention, new burst patterns may be formed with the magnetic-recording head positioned on the track based on computing the deviation of the magnetic-recording head.

In another embodiment of the present invention, the deviation of the magnetic-recording head that has occurred when the new burst patterns are formed may be stored in a memory as the misalignment information.

In one embodiment of the present invention, the amplitude of each of the burst signals is corrected based on amplitude-characteristic information related to the relationship between a position in the burst patterns and the amplitudes of the burst signals, in addition to the misalignment information.

In another embodiment of the present invention, the amplitude-characteristic information includes the amplitude gradients of the burst signals at the position where the burst signals are read out with the magnetic-recording head in the burst patterns.

In another embodiment of the present invention, the amplitude-characteristic information includes the amplitude gradients of the burst signals read out from at least two positions interposing the position where the burst signals are read out with the magnetic-recording head in the burst patterns.

In another embodiment of the present invention, the amplitude-characteristic information of each of the burst patterns may be obtained from tracks such that each of the tracks is chosen at intervals of a prescribed number of tracks.

In another embodiment of the present invention, a correction quantity of the amplitude of each of the burst signals is obtained before each of the burst signals is read out with the magnetic-recording head.

In accordance with an embodiment of the present invention, an apparatus for positioning a magnetic-recording head positions the magnetic-recording head on a track determined by a plurality of burst patterns such that positions of the plurality of burst patterns are different from each other in the scanning direction of the magnetic-recording head. In accordance with embodiments of the present invention, the apparatus for positioning a magnetic-recording head includes: correcting means for correcting amplitude of each of the burst signals read out with the magnetic-recording head from each respective burst pattern of the plurality of burst patterns; computing means for computing a deviation of the magnetic-recording head from the track based on corrected amplitudes of the plurality of burst signals; and controlling means for controlling positioning of the magnetic-recording head on the track based on the deviation of the magnetic-recording head.

In one embodiment of the present invention, an apparatus for positioning a magnetic-recording head positions the magnetic-recording head on a track determined by a plurality of burst patterns such that positions of the plurality of burst patterns are different from each other in the scanning direction of the magnetic-recording head. In accordance with embodiments of the present invention, the apparatus for positioning a magnetic-recording head includes a plurality of arithmetic circuits that are configured to receive as inputs both the amplitudes of a plurality of burst signals read out with the magnetic-recording head from the plurality of burst patterns and a plurality of correction quantities corresponding to the amplitudes of the plurality of burst signals, that are configured to obtain the corrected amplitudes of the plurality of burst signals, and that are configured to output the corrected amplitudes. In another embodiment of the present invention, the corrected amplitudes of the plurality of burst signals are used for computing the deviation of the magnetic-recording head from the track.

In another embodiment of the present invention, the apparatus further includes a selection circuit to switch signals used for computing the deviation of the magnetic-recording head between uncorrected amplitudes of the plurality of burst signals and the corrected amplitudes of the plurality of burst signals.

Embodiments of the present invention make it possible to obtain a deviation of a magnetic-recording head which is less affected by misalignment of each of a plurality of burst patterns by correcting the amplitude of each of the burst signals read out from the plurality of burst patterns before the deviation of the magnetic-recording head is computed.

Figure 1:
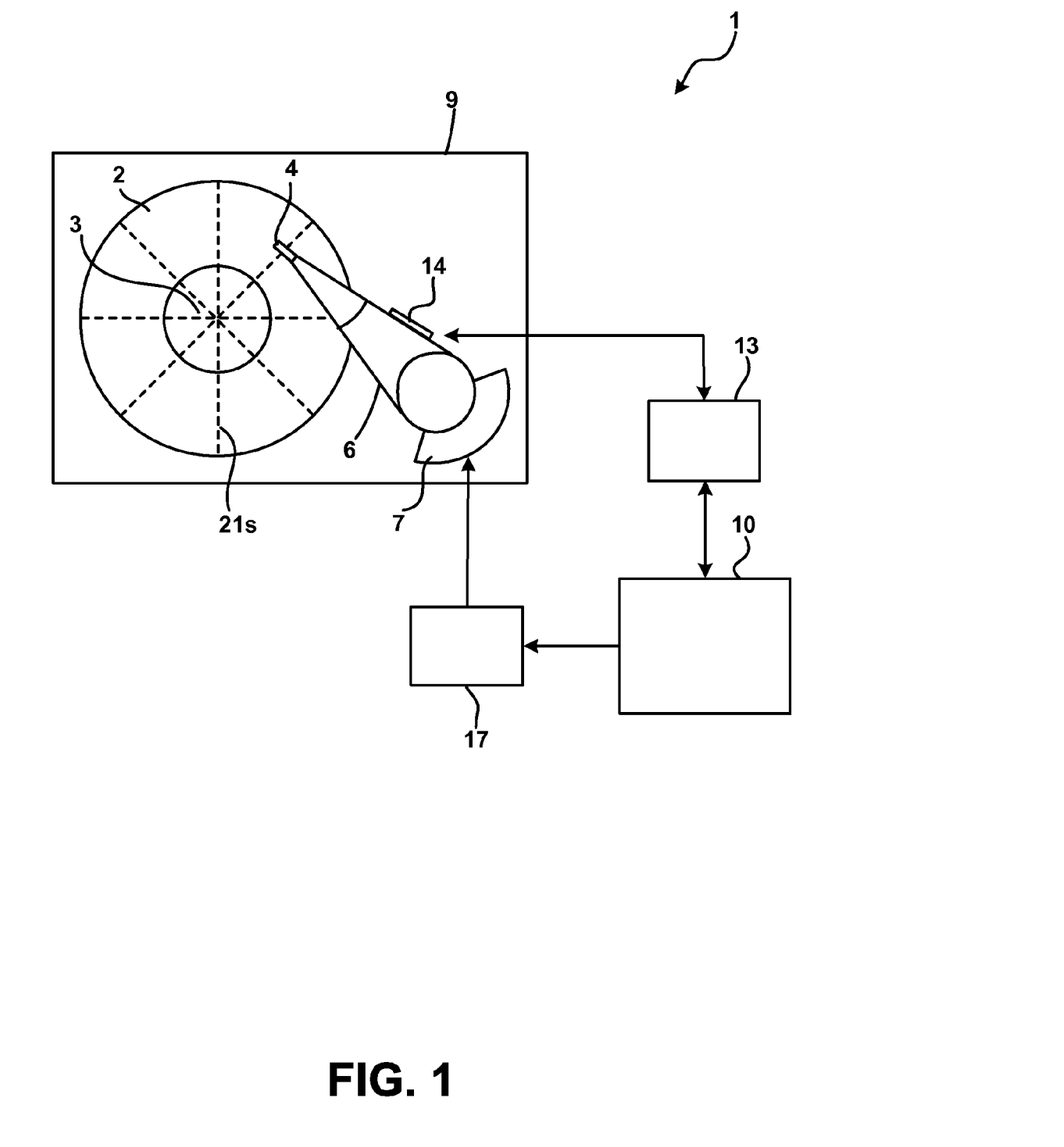
FIG. 1 is an example block diagram showing a configuration of an apparatus for positioning a magnetic-recording head, in accordance with an embodiment of the present invention.

With reference now to FIG. 1, in accordance with an embodiment of the present invention, an example block diagram that shows a configuration of the apparatus for positioning a magnetic-recording head is depicted. In accordance with an embodiment of the present invention, the apparatus for positioning a magnetic-recording head is configured as a HDD 1, by way of example without limitation thereto, which forms a servo pattern on a magnetic-recording disk 2. The magnetic-recording disk 2 and a head-arm assembly 6 are contained in a base of the disk enclosure (DE) 9 of the HDD 1. The magnetic-recording disk 2 is attached to a spindle motor 3 installed at the bottom of the base of the DE 9. A servo data region 21s is prepared at a predetermined position on the circumference of the magnetic-recording disk 2. A servo pattern including address patterns and burst patterns is formed at the servo data region 21s by a method which is subsequently described.

With further reference to FIG. 1, in accordance with an embodiment of the present invention, the head-arm assembly 6 is supported in proximity to the magnetic-recording disk 2 on a pivot shaft (not shown). A magnetic-recording head 4 is supported at the distal end of the head-arm assembly 6. A voice coil motor 7 is installed at the rear end, which is the end opposite to the distal end, of the head-arm assembly 6. The voice coil motor 7 includes an actuator to move the magnetic-recording head 4 in a prescribed scanning direction and moves the magnetic-recording head 4 nominally in the direction of the radius of the magnetic-recording disk 2 by driving the head-arm assembly 6 on the pivot shaft. As used herein, the phrase, "moves the magnetic-recording head nominally in the direction of the radius of the magnetic-recording disk," means that the magnetic-recording head moves approximately in the radial direction of the magnetic-recording disk as limited by the "skew" of the magnetic-recording head; "skew" is a term of art which refers to the misalignment of the center-line of the magnetic-recording head with respect to the circumferential direction of the magnetic-recording disk as the actuator swings the magnetic-recording head from tracks located on the inside-diameter (ID) to tracks located on the outside-diameter (OD) of the magnetic-recording disk. In addition, the HDD 1 has a control circuit 10, a channel circuit 13, and a driver circuit 17 on an integrated-circuit chip, which is disposed outside the base of the DE 9. The control circuit 10 includes a microprocessing unit (MPU), a hard disk controller (HDC), and an information-storage unit, such as a memory. The control circuit 10 generates data for forming a servo pattern on the magnetic-recording disk 2 and outputs the data to an amplifier circuit 14 through the channel circuit 13. The amplifier circuit 14 converts the data to a write signal and outputs the write signal to the magnetic-recording head 4. The magnetic-recording head 4 converts the write signal to a magnetic-recording field, applies the magnetic-recording field to the magnetic-recording disk 2, and thereby forms a servo pattern on the magnetic-recording disk 2.

With further reference to FIG. 1, in accordance with an embodiment of the present invention, the magnetic-recording head 4 converts a fringing magnetic field leaking out from the servo pattern formed on the magnetic-recording disk 2 into a read-back signal and outputs the read-back signal to the amplifier circuit 14. The amplifier circuit 14 amplifies the read-back signal and outputs it to the channel circuit 13. The channel circuit 13 extracts data from the read-back signal on a sampling cycle conforming to the allocation cycle of the servo data region 21s and outputs the data to the control circuit 10. The control circuit 10 controls the positioning of the magnetic-recording head 4 based on the data input from the channel circuit 13. More specifically, the control circuit 10: computes the deviation of the magnetic-recording head 4 from a track regarded as a target from burst signals included in the data input from the channel circuit 13; generates a control signal for suppressing the deviation; and outputs the control signal to the voice coil motor 7 through the driver circuit 17. The control of the positioning of the magnetic-recording head 4 is subsequently described in greater detail.

In accordance with an embodiment of the present invention, the magnetic-recording head 4 and the voice coil motor 7 in the base of the DE 9 are controlled with the control circuit 10, the channel circuit 13, and the driver circuit 17 included in the HDD 1 when a servo pattern is formed on the magnetic-recording disk 2, by way of example without limitation thereto, as an external apparatus that may be used to control the magnetic-recording head 4 and the voice coil motor 7 in the base of the DE 9 is also within the spirit and scope of embodiments of the present invention.

Figure 2:
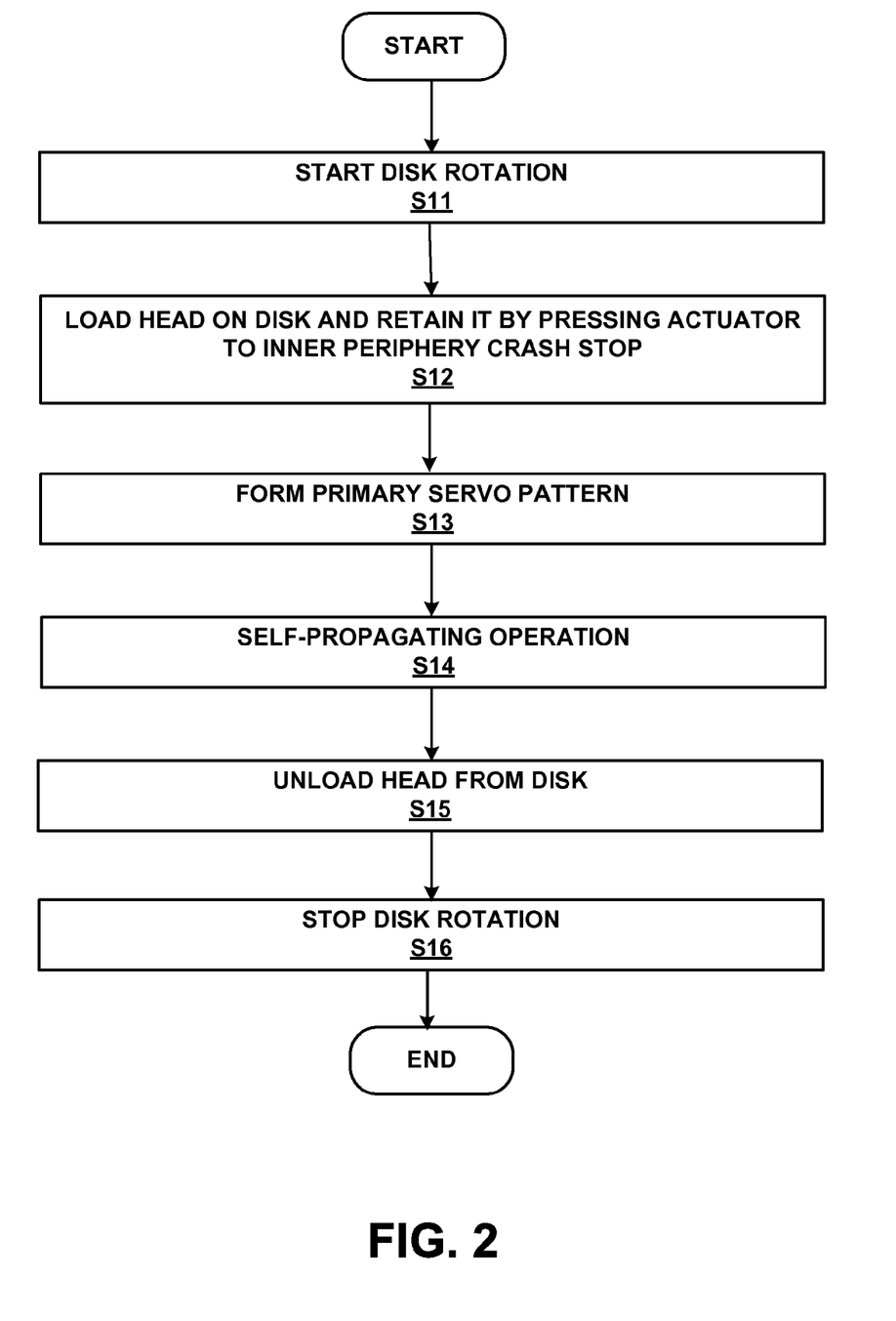
FIG. 2 is an example flowchart showing a method for forming a servo pattern on a magnetic-recording disk, in accordance with an embodiment of the present invention.

With reference now to FIG. 2, in accordance with an embodiment of the present invention, a flowchart shows a method applied to the HDD 1 for forming the servo pattern on the magnetic-recording disk 2. At S11, the HDD 1 including the magnetic-recording disk 2, on which a servo pattern has not already been formed, first activates the spindle motor 3 and starts the magnetic-recording disk 2 rotating. At S12, the HDD 1 loads the magnetic-recording head 4 onto the magnetic-recording disk 2, drives the voice coil motor 7 to move the actuator with the head-arm assembly 6 to a crash stop (not shown in the FIG. 1), and retains the magnetic-recording head 4 in the vicinity of the innermost periphery, which is the ID portion, of the magnetic-recording disk 2. As used herein, with respect to the magnetic-recording disk, the terms of art, "inner periphery, or innermost periphery," and "outer periphery," are identified with the terms of art, "inside diameter, or ID," and "outside diameter, or OD," respectively. At S13, in this state, the HDD 1 forms a primary servo pattern in the vicinity of the innermost periphery of the magnetic-recording disk 2 with the magnetic-recording head 4. At S14, after the primary servo pattern is formed in this way, the HDD 1 carries out a self-propagating operation from the inner periphery toward the outer periphery of the magnetic-recording disk 2 to form a full servo pattern on the whole magnetic-recording disk 2. At S15, after the magnetic-recording head 4 reaches the outer periphery and the complete servo pattern is formed, the magnetic-recording head 4 is unloaded from the magnetic-recording disk 2. At S16, after the retraction of the magnetic-recording head 4 is confirmed, the HDD 1 stops the spindle motor 3 and terminates the servo pattern writing, self-servo-writing (SSW), operation.

Figure 3:
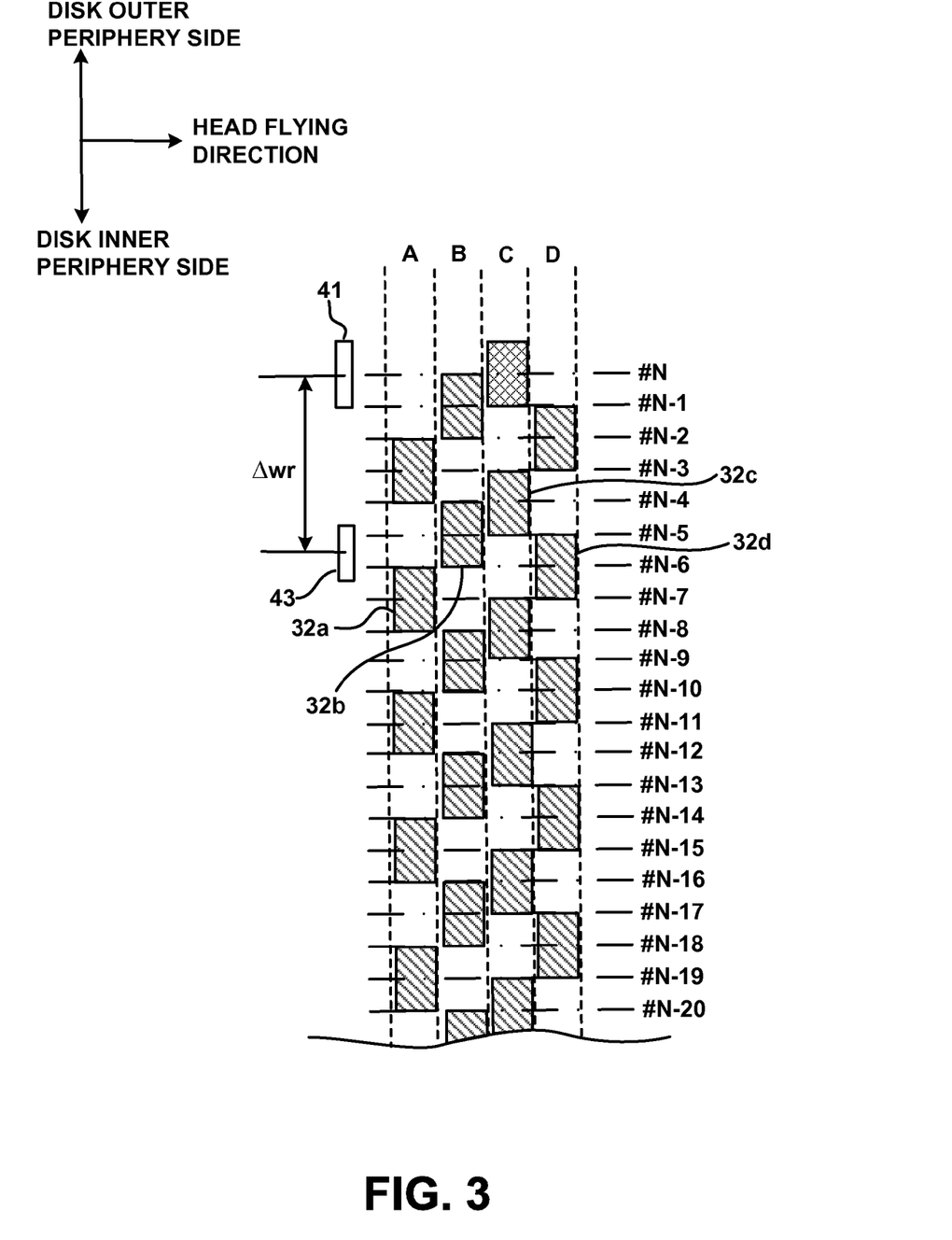
FIG. 3 is an enlarged view of an example of a substantial portion of a magnetic-recording disk during a self-propagating operation for forming a servo pattern on a magnetic-recording disk, in accordance with an embodiment of the present invention.

With reference now to FIG. 3, in accordance with an embodiment of the present invention, an enlarged view of an example of a substantial portion of the magnetic-recording disk 2 is shown during the self-propagating operation at S14 of FIG. 2. As shown in FIG. 3, the positions where burst patterns 32a to 32d are formed in a servo pattern are shown in an enlarged manner and a write element 41 and a read element 43 of the magnetic-recording head 4 are also shown. In the self-propagating operation at S14 of FIG. 2, the HDD 1 forms the burst patterns 32a to 32d track-by-track and replicates the burst patterns out to the outer periphery side, which is the OD portion, of the magnetic-recording disk 2 with the write element 41 of the magnetic-recording head 4. The burst patterns 32a to 32d, which are of four kinds that are designated A, B, C and D, which are disposed at different positions from one another in the radial direction, are formed on the magnetic-recording disk 2. The burst patterns 32a to 32d determine circular tracks running around the axis of rotation of the magnetic-recording disk 2. More specifically, the burst patterns 32a and 32b determine the tracks acting as the center for the writing of data to the magnetic-recording disk; and, the burst patterns 32c and 32d determine the in-between tracks. Each of the burst patterns 32a to 32d produces a burst signal when read by the read element 43 of the magnetic-recording head 4 that indicates the deviation, which is a relative position, of the magnetic-recording head 4 from each track.

With further reference to FIG. 3, in accordance with an embodiment of the present invention, the magnetic-recording head 4 includes the write element 41 that forms new burst patterns 32a to 32d and the read element 43 that may be offset towards on the ID side of the magnetic-recording disk 2 from the write element 41, by way of example without limitation thereto, and reads out the burst signals from already-formed burst patterns 32a to 32d. As shown in FIG. 3, a case where the offset Δwr between the write element 41 and the read element 43 in the radial direction of the magnetic-recording disk 2 corresponds to five to six tracks is depicted. For example, when a burst pattern 32c is formed on the Nth track with the write element 41, the read element 43 reads out burst signals from the burst pattern 32c on the N−4th track, the burst pattern 32b on the N−5th track, the burst pattern 32d on the N−6th track, and the burst pattern 32a on the N−7th track, respectively, those patterns being already formed, and uses them for positioning control of the magnetic-recording head 4.

Figure 4:
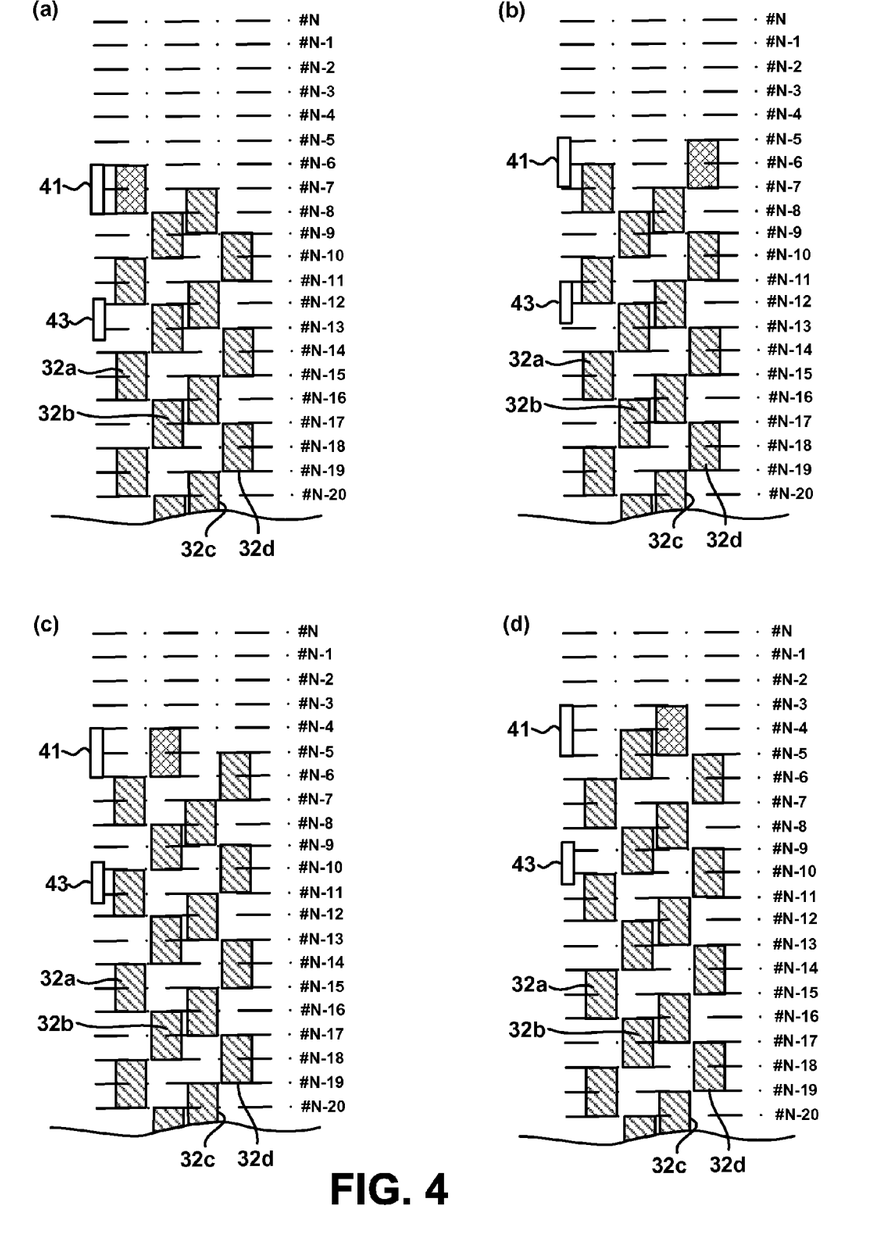
FIGS. 4(a) through 4(d) are views of portions of a magnetic-recording disk useful in describing examples of formation of each of several burst patterns on a magnetic-recording disk, in accordance with embodiments of the present invention.

With reference now to FIGS. 4(a) and 4(b), in accordance with an embodiment of the present invention, the burst patterns 32a to 32d generally do not form ideal circular tracks, as depicted in FIGS. 4(a) and 4(b), and misalignment may sometimes occur in the radial direction. Such misalignment is caused by the position error of the magnetic-recording head 4 when each of the burst patterns 32a to 32d is formed. For example, the burst pattern 32c on the N−4th track, the burst pattern 32b on the N−5th track, the burst pattern 32d on the N−6th track, and the burst pattern 32a on the N−7th track described above are formed with the write element 41 of the magnetic-recording head 4 as shown in FIGS. 4(a) to 4(d), respectively, a position error of the magnetic-recording head 4 occurs in this situation, and misalignment occurs individually.

Figure 5:
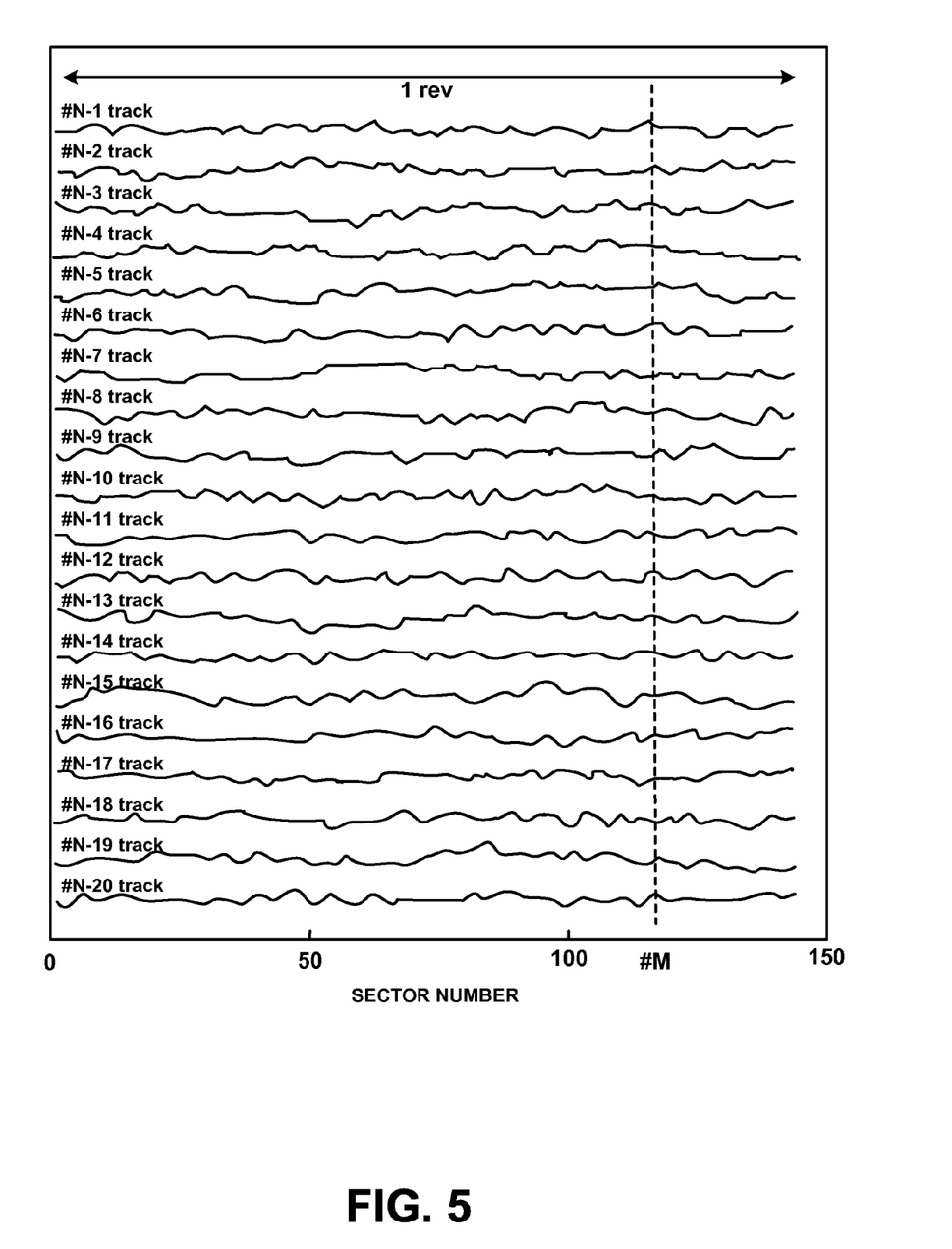
FIG. 5 is a series of position-error profiles useful in describing an example of misalignment information, in accordance with an embodiment of the present invention.

With reference now to FIG. 5, in accordance with an embodiment of the present invention, in order to use position errors for correcting the amplitude of a burst signal, the control circuit 10 obtains the position error of the magnetic-recording head 4 over the full circumferential length of a track for one full revolution of the magnetic-recording disk 2, which includes each sector, and stores the position error in a memory as misalignment information when each of the burst patterns 32a to 32d is formed, as is subsequently described in greater detail.

Figure 6:
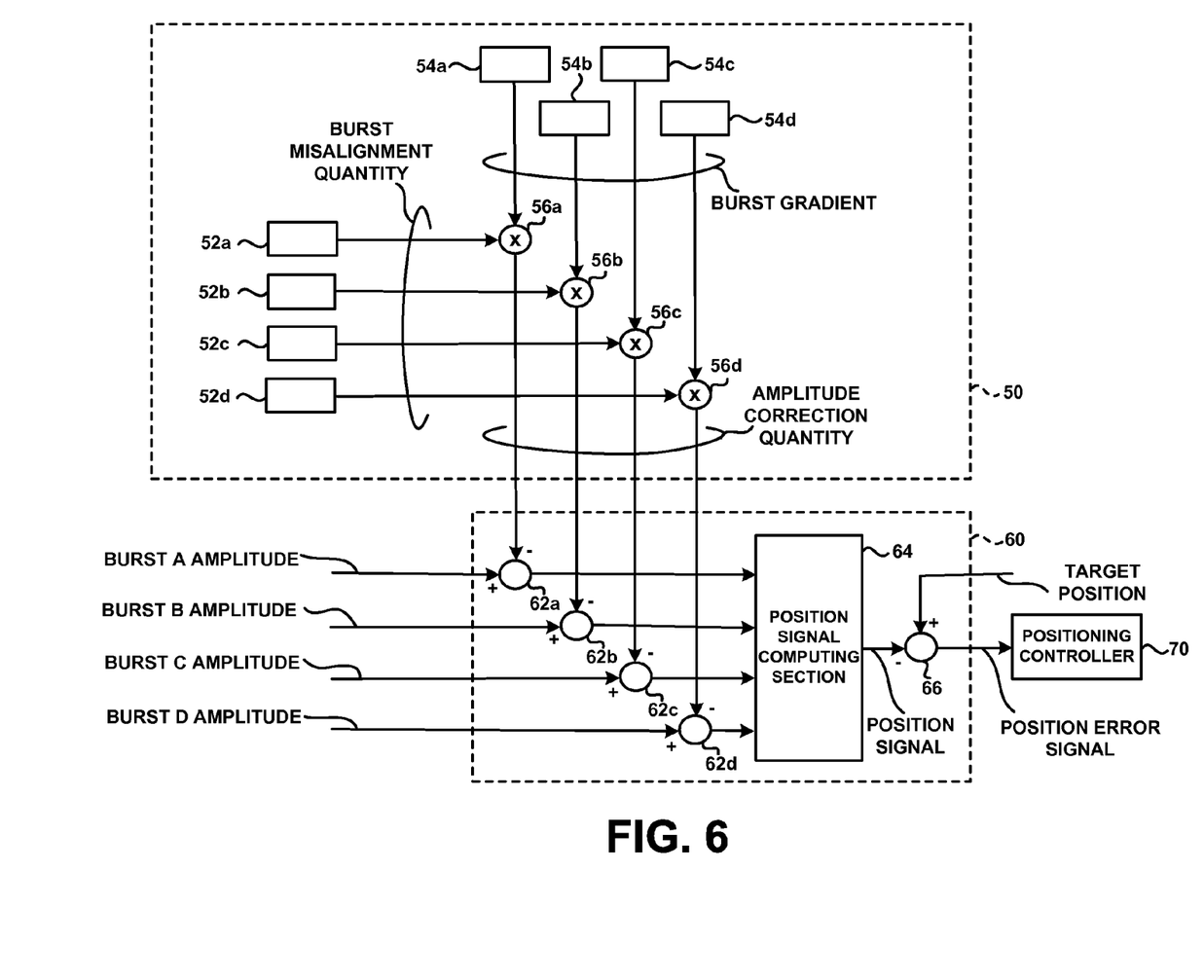
FIG. 6 is an example block diagram showing an actual configuration of a control circuit, in accordance with an embodiment of the present invention.

With reference now to FIG. 6, in accordance with an embodiment of the present invention, an example block diagram shows an actual configuration of the control circuit 10 to control the positioning of the magnetic-recording head 4. The control circuit 10 has: a correction quantity generating section 50, which is a correcting means, to output an amplitude correction quantity for correcting the amplitudes of four kinds of burst signals read out with the read element 43 of the magnetic-recording head 4; a position computing section 60, which is a computing means, to compute the position error of the magnetic-recording head 4 based on the corrected amplitudes of the four kinds of burst signals; and a positioning controller 70, which is a controlling means, to control the voice coil motor 7 in response to the position error of the magnetic-recording head 4.

With further reference to FIG. 6, in accordance with an embodiment of the present invention, each of the burst patterns 32a to 32d has misalignment and the effect of the misalignment is included in each of the burst signals input into the control circuit 10, as described above. The control circuit 10 corrects the amplitude of each of the burst signals including the effect of the misalignment before a position signal is computed. In other words, the position computing section 60 has addition sections 62a to 62d to correct the amplitude of each of the burst signals with each of the amplitude correction quantities input from the correction quantity generating section 50 and output them to a position signal computing section 64. The position signal computing section 64 computes a position signal representing the current position of the magnetic-recording head 4 based on the input corrected burst signals and outputs the position signal to an error signal generating section 66. The error signal generating section 66 produces a position error signal (PES) representing the position error of the magnetic-recording head by obtaining the difference between the target position and the current position of the magnetic-recording head 4. The positioning controller 70 controls the voice coil motor 7 in response to the PES thus obtained and positions the magnetic-recording head 4 to a target position. Then, the control circuit 10 forms a new servo pattern with the write element 41 in this state of positioning the magnetic-recording head 4 as described above. Further, the control circuit 10 obtains the position error of the magnetic-recording head 4 at this time and stores the position error in a memory as misalignment information.

With further reference to FIG. 6, in accordance with an embodiment of the present invention, it is also possible to apply the method for positioning the magnetic-recording head to a circular track the center of which is offset from the axis of rotation of the magnetic-recording disk 2 or a track of another shape by changing the target position given when the aforementioned PES is produced in response to the rotation angle of the magnetic-recording disk 2. Consequently, in accordance with an embodiment of the present invention, it is also possible to apply the method for positioning the magnetic-recording head even to the case of, so-called, discrete track media (DTM) where a track from which data is read and to which data is written includes a patterned magnetic-recording layer of the magnetic-recording disk.

Figure 7:
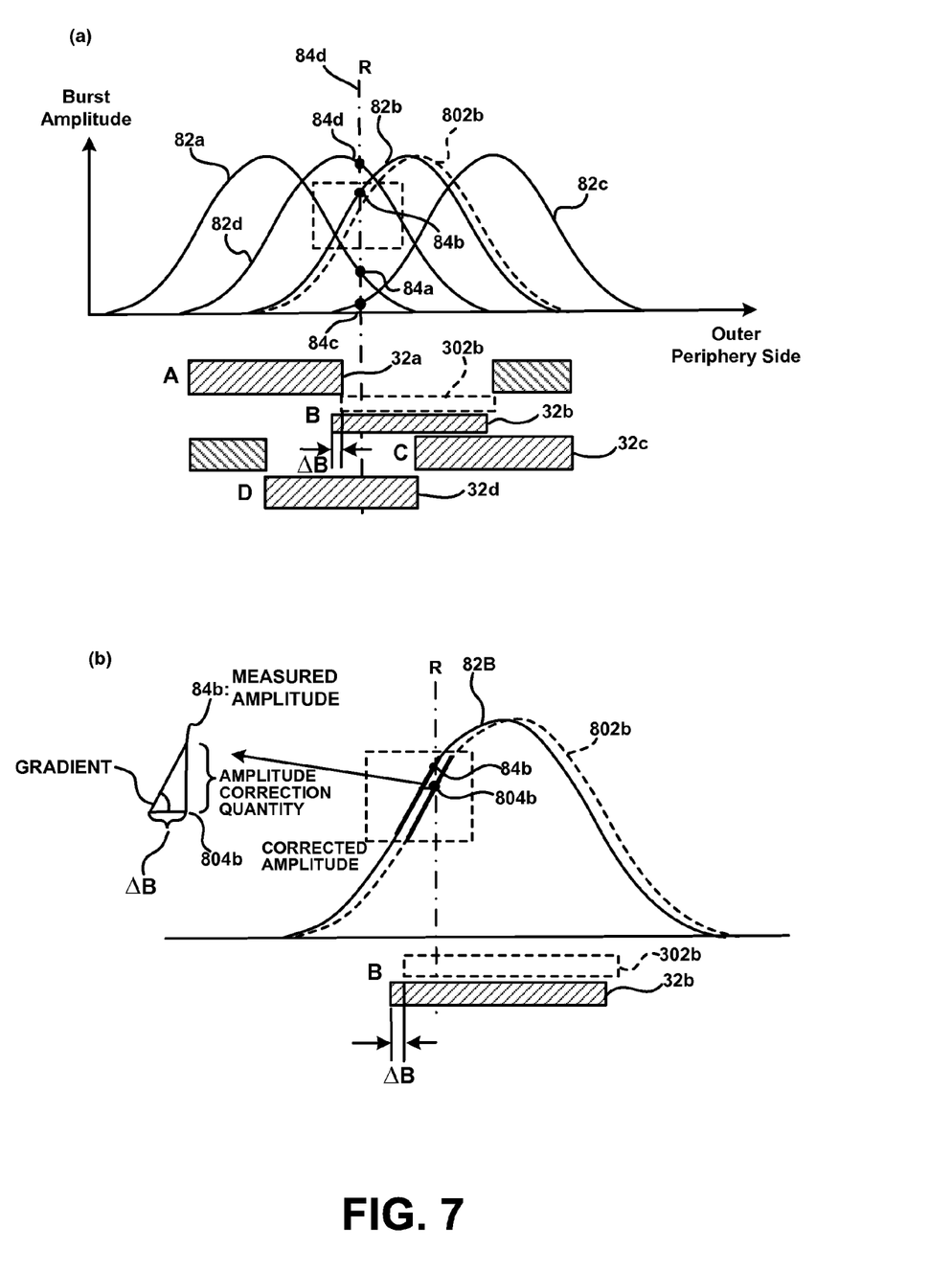
FIGS. 7(a) and 7(b) are graphs that show, by way of example, the positional relationship between burst patterns and amplitude profiles, in accordance with an embodiment of the present invention.

With further reference to FIG. 6, in accordance with an embodiment of the present invention, an actual configuration of the correction quantity generating section 50 is next described. The correction quantity generating section 50 has: memories 52a to 52d to retain misalignment information representing the misalignment quantity of each of the burst patterns 32a to 32d; memories 54a to 54d to retain amplitude-characteristic information representing the amplitude gradient of each of the burst signals at the position of the read element 43; and multiplication sections 56a to 56d to obtain the amplitude correction quantity of each of the burst signals by multiplying them together. The operations of the correction quantity generating section 50 are next described with reference to FIG. 7.

With reference now to FIG. 7(a), in accordance with an embodiment of the present invention, a graph shows the positional relationship between the burst patterns 32a to 32d and the amplitude profiles 82a to 82d of the burst signals read out from the burst patterns 32a to 32d. In each of the amplitude profiles 82a to 82d, the amplitude takes the maximum value in the center of each of the burst patterns 32a to 32d and attenuates in proportion to the distance from the center and has a shape of a peak. Then, the amplitudes 84a to 84d of the burst signals are obtained at the radial position R where the read element 43 is located. In other words, the points at which the line representing the radial position R intersects with the amplitude profiles 82a to 82d show the amplitudes 84a to 84d of the burst signals read out with the read element 43.

With reference now to FIG. 7(b) and further reference to FIG. 7(a), in accordance with an embodiment of the present invention, an ideal burst pattern 302b based on the assumption that the burst pattern 32b is formed without causing misalignment and an ideal amplitude profile 802b obtained from the ideal burst pattern 302b are shown. In this way, the amplitude 84b, which is a measured amplitude, of the burst signal read out from the burst pattern 32b at the radial position R when misalignment has occurred in comparison with the ideal burst pattern 302b differs from the amplitude 804b, which is an ideal amplitude, of the burst signal read out from the ideal burst pattern 302b at the radial position R. In this context, an amplitude correction quantity to compensate the difference between the measured amplitude 84b and the ideal amplitude 804b is obtained from the misalignment quantity ΔB of the burst pattern 32b and the amplitude gradient of the burst signal at the radial position R. In other words, at the correction quantity generating section 50 shown in FIG. 6, an amplitude correction quantity to compensate the difference between the measured amplitude and the ideal amplitude of each of the burst signals is obtained by multiplying the misalignment quantity of each of the burst patterns 32a to 32d represented by misalignment information retained in each of the memories 52a to 52d and the amplitude gradient of each of the burst signals at the position of the read element 43 represented by amplitude-characteristic information retained in each of the memories 54a to 54d together at the multiplication sections 56a to 56d.

With further reference to FIGS. 7(a) and 7(b), in accordance with an embodiment of the present invention, the misalignment information retained in each of the memories 52a to 52d: is the information stored as the position error of the magnetic-recording head 4 when each of the burst patterns 32a to 32d was formed in the past as stated above; and represents the quantity of the misalignment of each of the burst patterns 32a to 32d. In contrast, the amplitude-characteristic information retained in each of the memories 54a to 54d: is information representing the relationship between the position in each of the burst patterns 32a to 32d and the amplitude of each of the burst signals obtained from the burst patterns 32a to 32d; and, represents the amplitude gradient, which is the amplitude change rate, of each of the burst signals at the radial position R where the read element 43 is located.

Figure 8:
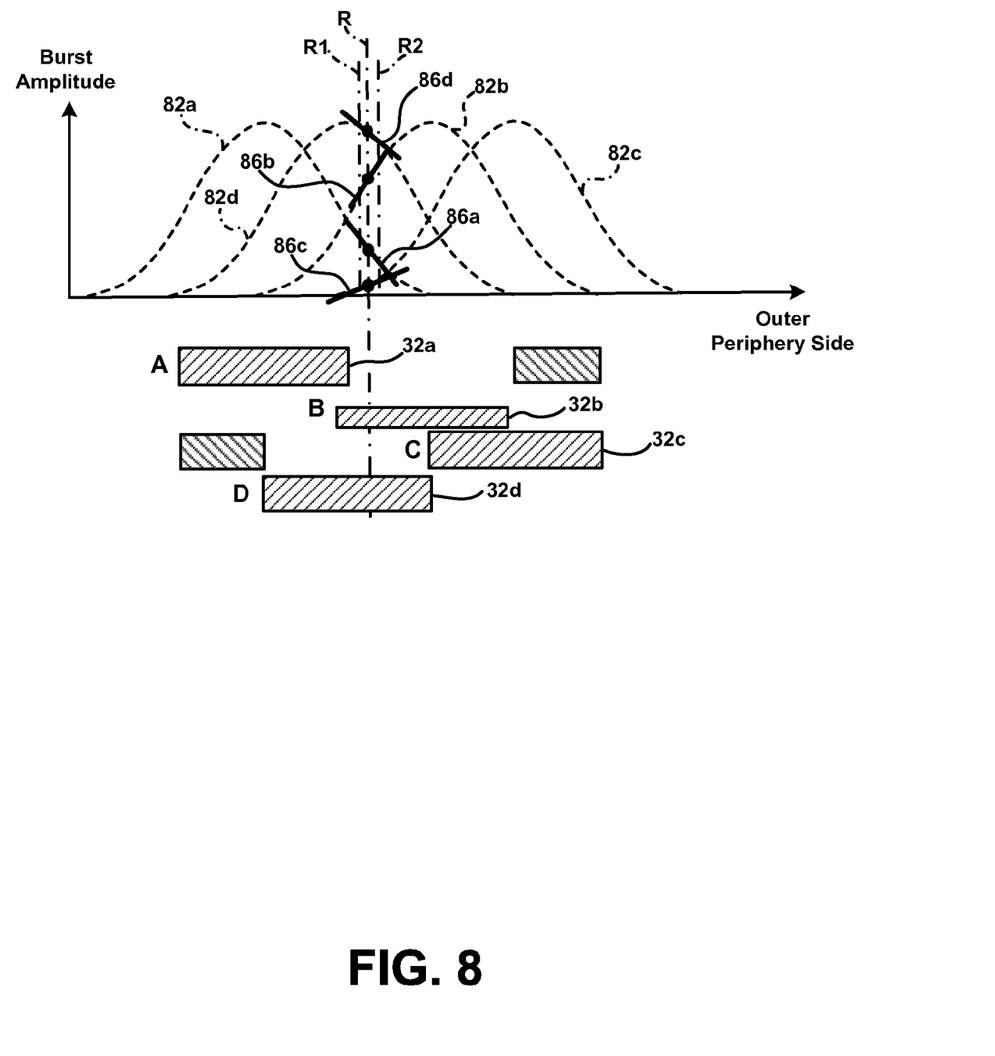
FIG. 8 is a graph useful in describing an example of amplitude-characteristic information, in accordance with an embodiment of the present invention.

With reference now to FIG. 8, in accordance with an embodiment of the present invention, such an amplitude gradient may be obtained by measuring the amplitudes of each of the burst signals at two radial positions R1 and R2 interposing the radial position R where the read element 43 is located as shown in FIG. 8. In accordance with an embodiment of the present invention, it is also possible to: measure and store the overall amplitude profiles 82a to 82d of the burst signals during so-called calibration to calibrate the quantity of electricity supplied to the voice coil motor 7 by moving the magnetic-recording head 4 little by little at small intervals in the scanning direction; and, based on those movements, obtain the amplitude gradient of each of the burst signals at the radial position R where the read element 43 is located. Further, such amplitude-characteristic information may be obtained on tracks every several hundred tracks, for example. In other words, the position where the read element 43 of the magnetic-recording head 4 is located varies in response to the radial position of the magnetic-recording disk 2 in the burst patterns 32a to 32d, but the degree of the variation is negligibly small; and, hence, it is also possible to obtain amplitude-characteristic information on tracks at intervals of about several hundred steps, for example, and apply the amplitude-characteristic information to tracks in between.

As described above, with further reference to FIG. 8, in accordance with an embodiment of the present invention, since a position signal is computed based on the corrected burst signals after the amplitude of each of the burst signals read out from the burst patterns 32a to 32d is corrected individually, it is possible to appropriately control the effect of the misalignment of each of the burst patterns 32a to 32d on the position signal. Thus, it is possible to inhibit misalignment from accumulating when the burst patterns 32a to 32d are formed. Particularly, a complicated algorithm has been used, in recent years, with the aim of reducing nonlinearity when a position signal is computed; and, hence, it is not easy to remove the effect of the misalignment of each burst pattern from the computed position signal. By computing a position signal from corrected burst signals, as in the case of an embodiment of the present invention, however, it is possible to appropriately control the effect of the misalignment of each of the burst patterns 32a to 32d on the position signal. Furthermore, in an embodiment of the present invention, it is possible to appropriately control the effect of the misalignment of each of the burst patterns 32a to 32d on the position signal without depending on an algorithm for computing a position signal.

Figure 9:
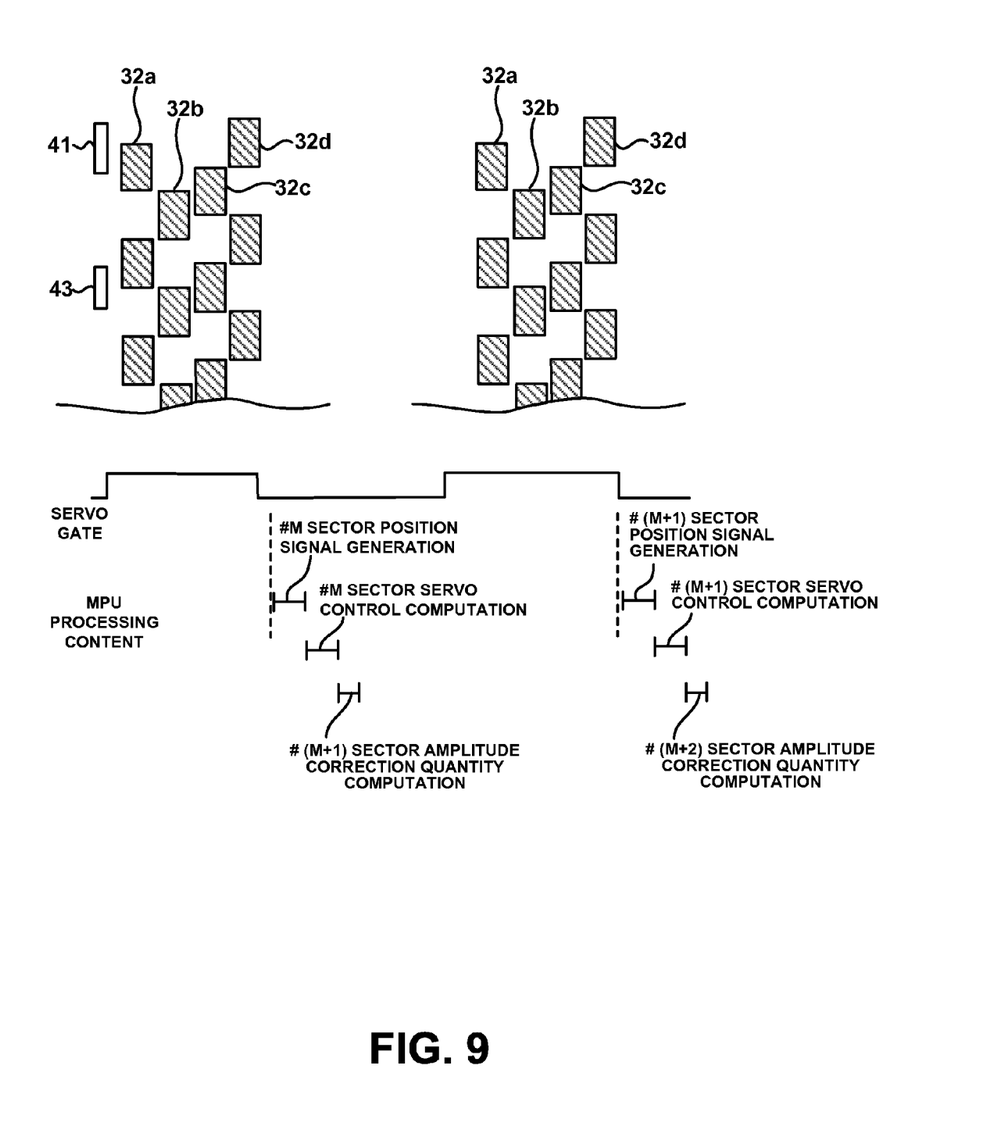
FIG. 9 is a view of portions of a magnetic-recording disk useful in describing an example of the timing for computing amplitude correction quantities, in accordance with an embodiment of the present invention.

With reference now to FIG. 9, in accordance with an embodiment of the present invention, an example of timing for computing such an amplitude correction quantity is described. As shown in FIG. 9, the process of computing an amplitude correction quantity is carried out before burst signals are read out from the burst patterns 32a to 32d of a sector as the target. Then, after the burst signals are read out from the burst patterns 32a to 32d of the target sector, the process of correcting the amplitudes of the burst signals individually with an amplitude correction quantity obtained beforehand is carried out. More specifically, when a servo gate is gated on and burst signals are read out from the burst patterns 32a to 32d of the Mth sector, the burst signals are corrected individually with an amplitude correction quantity computed beforehand, then a position signal at the Mth sector is computed, and the control signal of the voice coil motor 7 is computed based on the position signal. In this way, an amplitude correction quantity used at the M+1th sector as the succeeding sector is obtained. Such a series of operations is carried out at each sector. As described above, by obtaining the amplitude correction quantity used at the succeeding sector before burst signals are read out from the sector, it is possible to compute a position signal immediately after the burst signals are read out from the sector and to prevent delay in the positioning control of the magnetic-recording head 4.

Figure 10:
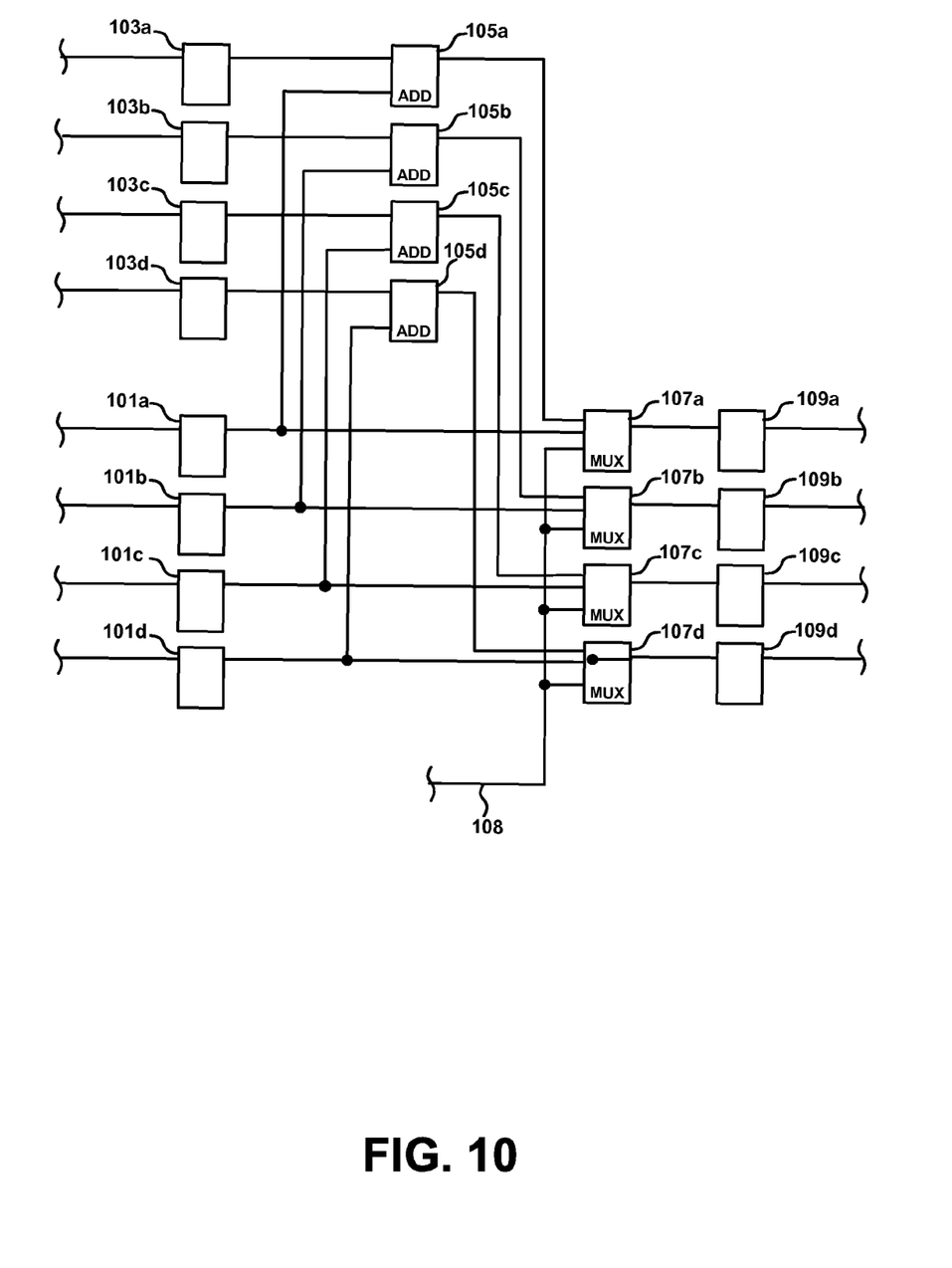
FIG. 10 is an example block diagram showing a modified example of a circuit for computing amplitude correction quantities, in accordance with an embodiment of the present invention.

With reference now to FIG. 10, in accordance with an embodiment of the present invention, a modified example of the part of the process for correcting the amplitude of each burst signal of the plurality of burst signals in the control circuit 10 is described. FIG. 10 is an example block diagram showing the circuit of the present modified example. The control circuit 10 includes: registers 101a to 101d to store the amplitudes of a plurality of burst signals read out from burst patterns 32a to 32d as digital data respectively; registers 103a to 103d to store the correction quantities to the amplitudes as digital data respectively; and adder circuits 105a to 105d, which are arithmetic circuits, to add the correction quantities to the amplitudes, respectively. In an embodiment of the present invention, the correction quantities stored in the registers 103a to 103d are the amplitude correction quantities computed with the correction quantity generating section 50 as described above in the discussion of FIG. 6. Furthermore, the control circuit 10 includes registers 109a to 109d to store quantities added with the adder circuits 105a to 105d, namely amplitudes of burst signals after correction, respectively, which are corrected amplitudes. The corrected amplitudes stored in the registers 109a to 109d are output to the position signal computing section 64 in FIG. 6 and used for controlling the magnetic-recording head 4. By adopting such configuration, it is possible to quickly obtain corrected amplitudes to produce a position signal and to prevent delay in the positioning control of the magnetic-recording head 4.

With further reference to FIG. 10, in accordance with an embodiment of the present invention, the control circuit 10 includes multiplexers 107a to 107c, which are selection circuits, to switch the values stored in the registers 109a to 109d between the uncorrected amplitudes of burst signals, namely amplitudes stored in the registers 101a to 101d and the corrected amplitudes of the burst signals, namely the corrected amplitudes added with the adder circuits 105a to 105d. By so doing, it is possible to switch the values used for positioning the magnetic-recording head 4 between the corrected amplitudes of the burst signals and the uncorrected amplitudes of the burst signals. For example, the corrected amplitudes of the burst signals are selected when a servo pattern is formed and the uncorrected amplitudes of the burst signals are selected when data is read from, or written to, the magnetic-recording disk, as in a commercial HDD product.

Although the embodiments of the present invention have been described above, the embodiments of the present invention are not limited to the above-described embodiments of the present invention; and, it is possible for those skilled in the art to carry out various modifications. For example, the positioning control of the magnetic-recording head 4 may be applied, not only to the case of forming a servo pattern on the magnetic-recording disk 2, but also to the case of reading and writing data in a commercially manufactured HDD. Moreover, the amplitude correction quantities may be obtained at the correction quantity generating section 50, not only in the above-described embodiments of the present invention, but also, for example, by multiplying the misalignment quantities of burst patterns represented by misalignment information by a prescribed value.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for positioning a magnetic-recording head, said method comprising:
    correcting amplitude of each burst signal of a plurality of burst signals read out with said magnetic-recording head from each respective burst pattern of a plurality of burst patterns;
    computing a deviation of said magnetic-recording head from a track based on corrected amplitudes of said plurality of burst signals; and
    positioning said magnetic-recording head on said track based on said deviation of said magnetic-recording head, wherein said amplitude of each burst signal of said plurality of burst signals is corrected based on misalignment information that is obtained before said deviation of said magnetic-recording head is computed and related to said misalignment of each of said burst patterns perpendicular to said scanning direction and wherein said amplitude of each of said burst signals is corrected based on amplitude-characteristic information related to said relationship between a position in said burst patterns and said amplitudes of said burst signals and wherein said amplitude-characteristic information comprises said amplitude gradients of said burst signals read out from at least two positions interposing said position where said burst signals are read out with said magnetic-recording head in said burst patterns.

2. The method of claim 1, wherein said misalignment information comprises said deviation of said magnetic-recording head that has occurred when said burst patterns were formed.

3. The method of claim 1, wherein new burst patterns are formed with said magnetic-recording head positioned on said track based on computing said deviation of said magnetic-recording head.

4. The method of claim 3, wherein said deviation of said magnetic-recording head that has occurred when said new burst patterns were formed is stored in a memory as said misalignment information.

5. The method of claim 1, wherein the amplitude-characteristic information comprises said amplitude gradients of said burst signals at said position where said burst signals are read out with said magnetic-recording head in said burst patterns.

6. The method of claim 1, wherein said amplitude-characteristic information of each of said burst patterns is obtained from tracks such that each of said tracks is chosen at intervals of a prescribed number of tracks.

7. The method of claim 1, wherein a correction quantity of said amplitude of each of said burst signals is obtained before each of said burst signals is read out with said magnetic-recording head.

8. A method for positioning a magnetic-recording head, said method comprising:
    correcting amplitude of each burst signal of a plurality of burst signals read out with said magnetic-recording head from each respective burst pattern of a plurality of burst patterns;
    computing a deviation of said magnetic-recording head from a track based on corrected amplitudes of said plurality of burst signals; and
    positioning said magnetic-recording head on said track based on said deviation of said magnetic-recording head, wherein a correction quantity of said amplitude of each of said burst signals is obtained before each of said burst signals is read out with said magnetic-recording head.

* * * * *